United States Patent [19]

Hwo

[11] Patent Number: 4,666,778

[45] Date of Patent: May 19, 1987

[54] PACKAGING FILM AND SHEET CAPABLE OF FORMING PEELABLE SEALS WITH GOOD OPTICS

[75] Inventor: Charles C. Hwo, Sugar Land, Tex.

[73] Assignee: Shell Oil Company, Houston, Tex.

[21] Appl. No.: 867,656

[22] Filed: May 27, 1986

Related U.S. Application Data

[63] Continuation-in-part of Ser. No. 646,390, Aug. 31, 1984, abandoned.

[51] Int. Cl.⁴ .................... B32B 27/08; B32B 27/32
[52] U.S. Cl. .................... 428/412; 428/476.1; 428/483; 428/516; 428/518
[58] Field of Search ............ 428/412, 483, 516, 518, 428/476.1

[56] References Cited

U.S. PATENT DOCUMENTS

| | | | |
|---|---|---|---|
| 3,259,507 | 7/1966 | Smith | 99/172 |
| 3,655,503 | 4/1972 | Stanley et al. | 161/165 |
| 3,739,052 | 6/1973 | Ayres et al. | 264/92 |
| 3,817,821 | 6/1974 | Gallini et al. | 161/165 |
| 3,879,492 | 4/1975 | Bontinick | 260/857 D |
| 3,900,534 | 8/1975 | Schard | 260/897 A |
| 3,935,048 | 1/1976 | Rucker | 156/203 |
| 3,947,204 | 3/1976 | Ayres et al. | 425/383 |
| 3,995,763 | 12/1976 | Ayres et al. | 220/74 |
| 4,005,967 | 2/1977 | Ayres et al. | 425/326 R |
| 4,014,965 | 3/1977 | Stube et al. | 264/23 |
| 4,020,215 | 4/1977 | Michaylor | 428/420 |
| 4,078,020 | 3/1978 | Rose et al. | 260/897 A |
| 4,079,570 | 3/1978 | Rucker | 53/39 |
| 4,161,502 | 7/1979 | Wessling et al. | 264/119 |
| 4,188,350 | 2/1980 | Vicik et al. | 525/232 |
| 4,189,519 | 2/1980 | Ticknor | 428/476 |
| 4,277,578 | 7/1981 | Yoshimura et al. | 525/211 |
| 4,352,766 | 10/1982 | Bradley et al. | 264/45.5 |

OTHER PUBLICATIONS

Films and Sheeting, Encyclopedia of Polymer Science and Technology, pp. 764–769.
Film Blowing, pp. 238–239.

*Primary Examiner*—Carman J. Seccuro
*Attorney, Agent, or Firm*—Wendy K. B. Buskop

[57] ABSTRACT

Films or sheets are fabricated from blends of an ethylenic polymer or copolymer, a butene-1 polymer or copolymer, and a propylene polymer or copolymer which result in improved optical clarity, heat seal strength and peel seal characteristics.

5 Claims, No Drawings

PACKAGING FILM AND SHEET CAPABLE OF FORMING PEELABLE SEALS WITH GOOD OPTICS

This is a continuation in part of copending U.S. patent application Ser. No. 646,390 filed Aug. 31, 1984, now abandoned.

BACKGROUND OF THE INVENTION

The present invention relates to a heat sealable wrapping or packing film and sheet laminates which is capable of forming a peelable seal and which exhibits good optical qualities. The seal is achievable either between two films of this kind or between one film of this kind and another wrappable packing film of any other kind without affecting optical qualities.

A peelable seal is defined to be the seal or joint between two films produced by heat sealing or impulse sealing, the joint thus formed having the property of being able to open in the original plane of joining of the two films by the action of a pulling force, without wrenching off or tearing occurring in the material of the two films used to make up the joint. For the purposes of the present invention, the peelable seal must possess a mechanical resistance sufficient to maintain the wholeness and the tight-seal properties of the packing and wrapping during storage and transport until such time as the packing or wrapping is opened by the user of the article. The mechanical resistance of the peelable seal must be low enough to permit ready manual opening of the joint, i.e., without the use of any auxiliary instrument.

In addition, the film used for wrapping or packing of certain commercial products must exhibit good optical qualities, such as low percent haze. Foodstuffs, for example, fruit, vegetables, meat and the like necessitate a wrapping or packaging of very transparent films, as do medical and surgical products.

In the past, many varieties of thermoplastic materials have been employed in the manufacture of films capable of forming peelable seals. See, for example, U.S. Pat. No. 4,189,519, which discloses a blend for producing a peelable heat seal comprising about 50 to 90 percent by weight of a copolymer of about 80 to 96 percent by weight ethylene and about 4 to 20 percent by weight of an ethylenically unsaturated ester and about 10 to 50 percent by weight of a crystalline isotactic polybutylene. While a peel seal patent, the film of '519 does not exhibit the low percent haze values characteristic of a film with good optics.

U.S. Pat. No. 3,900,534 discloses thermoplastic shrink films with good heat seal characteristics and good optical properties, however, '534 does not address the need for a peel seal film which also has good optics.

There has been a long felt need for a wrapping or packing material having easy peelability at the seal and yet which possesses good optics which results in a transparent film for meat and other articles where it may be necessary or desirable for the consumer to clearly see the wrapped product.

SUMMARY OF THE INVENTION

It has now been found that certain properties including heat seal strength, peel seal characteristics and optical clarity of wrapping films or sheets may be improved by fabricating films or sheets from blends of an ethylenic polymer or copolymer, a butene-1 polymer or copolymer and a propylene polymer or copolymer. Reference is made within this application to films but it should be kept in mind that sheets may be formed, as well.

In the present invention, the film comprises a mixture containing preferably about 80 percent by weight of an ethylenic polymer or copolymer (such as polyethylene or EVA), about 15 percent by weight of polybutylene, and about 5 percent by weight of polypropylene. The mixture of polymers may range from about 65 percent by weight to about 85 percent by weight of the ethylenic polymer or copolymer, from about 5 percent by weight to about 30 percent by weight of the butene-1 polymer or copolymer and from about 3 percent by weight to about 15 percent by weight of the propylene polymer or copolymer. It has been surprisingly found that the selective addition of certain amounts of polypropylene to a blend of butene-1 polymer or copolymer and an ethylenic polymer or copolymer such as polyethylene or EVA, produces peel sealable films which also exhibit improved optical properties and processability.

DETAILED DESCRIPTION OF THE PREFERRED EMBODIMENT

Applicants have found that a wrappable film may be made which has improved clarity and which is capable of forming peel seals and comprises a mixture containing from about 65 percent by weight to about 85 percent by weight of an ethylenic polymer or copolymer, from about 5 percent by weight to about 30 percent by weight of a butene-1 polymer or copolymer, and from about 3 percent by weight to about 15 percent by weight propylene polymer or copolymer.

More preferably, the film composition comprises a mixture which contains from about 70 percent by weight to about 80 percent by weight of the ethylenic polymer or copolymer, from about 10 percent by weight to about 25 percent by weight of the butene-1 polymer or copolymer, and from about 5 percent by weight to about 10 percent by weight of the propylene polymer or copolymer.

Most preferably, the film composition comprises a mixture which contains about 80 percent by weight of the ethylenic polymer or copolymer, about 15 percent by weight of the butene-1 polymer or copolymer, and about 5 percent by weight of the propylene polymer or copolymer.

The ethylenic polymer or copolymer may be linear low density polyethylene (LLDPE), low density polyethylene (LDPE), medium density polyethylene (MDPE), ethylene vinyl acetate copolymer (EVA), ethylene-methyl acrylate copolymer (EMA), or high density polyethylene (HDPE) and is most preferably low density polyethylene or ethylene vinyl acetate copolymer.

The said polymer mixtures may be formed into an oriented or unoriented film by casting or film blowing method. After fabrication the film can be heat sealed by sealing jaws at a preset temperature, pressure and dwell. The seal strength is tested by an Instron tensile tester at 10"/min. crosshead speed. Maximum strength on a one inch width strip was designated as peel seal strength.

These manufacturing techniques apply to film, although this invention may also apply to sheeting. Film refers to shaped plastics that are comparatively thin and have a maximum thickness of 0.010 inches (10 mils).

Sheeting is a shaped plastic having a thickness greater than 0.010 inches.

The present invention may also comprise the coating layer of a laminated structure which would comprise one of the following as a substrate: nylon, polyester, polyvinyl chloride (PVC), high density polyethylene (HDPE) polypropylene (PP), polycarbonate (PC) or polystyrene (PS). The peel seal coat, which consists of polybutylene, polypropylene and either polyethylene or EVA, would be coated onto the substrate selected.

The laminate can be made by extrusion coating, co-extrusion solvent coating or by making two separate films that are then laminated. If the laminate is made by extrusion coating, the laminate is made by the casting method which is a flat die-melt extrusion process. If the laminate is made by co-extrusion, this may be done by either the melt extrusion flat die-casting process or by film blowing which consists of melt extrusion with a circular die. The lamination may be prepared from two separate films which were prefabricated by either the blowing or the casting method.

Melt extrusion with a flat die (casting) may be accomplished for thermoplastic polymers by using a flat die or slot die. The extrusion process starts with a polymer in a form that can be fed continuously into an extruder by means of a screw or pneumatic tube. Sometimes the polymers are combined with materials such as plasticizers, lubricants, stabilizers and colorants by means of Banbury mixers. The resulting mix is extruded through rod shaped dies and chipped into pellets. Pelletized polymer is fed into a screw conveyor into the end of a screw-type extruder and is heated and made into viscous fluid in a cylinder by means of a revolving, helical screw. The sheet emitting from the die is quenched on a temperature controlled chill roll. Finished films may be subject to a two-way stretching using continuous tenter-frame operations in biaxially orientation.

EXAMPLE 1

BLOWN FILM

Two polybutylene film grades (Shell PB 1600 SA and Shell PB 1710 SA) having a melt index (MI) of about 1.0 g/10 min. and a density of about 0.910 g/cm$^3$ were separately dry blended in a tumble mixer with 80 percent by weight of polyethylene NA 386 by USI Chemical). The resultant blends were extruded at a die temperature of about 375° F. into blown films of about 2.0 mils thickness each using a circular die. Optical properties were measured after the film was aged at room temperature for seven days.

Also, after the film was cooled, one inch wide strips were cut from the film at locations across its width and opposite sides of the samples were then laminated together in face to face contact, using 20 pounds per square inch of pressure and a dwell time of about two seconds. Physical properties are given for the various films in the following tables. Table 1 illustrates the optical properties of blown film from a polyethylene/-polybutylene (PE/PB) blend, or a polyethylene/-polybutylene/polypropylene blend (PE/PB/PP) for peel seal applications.

TABLE 1

Optical Properties of Blown Film From PE/PB or PE/PB/PP Blends for Peel Seal Applications for Two Commercial Polybutylene Film Grades

| Blend Composition | Haze, % | Gloss (45°) | Clarity, % |
|---|---|---|---|
| 1. PE + 20% PB 1600SA — Control | 17.4 | 25 | 0.3 |
| 2. PE + 20% PB 1710SA | 15.4 | 33 | 0.46 |

Note:
PE is USI NA 386 polyethylene at MI = 1.5
PB 1600SA is Shell polybutylene at MI = 1.0
PB 1710SA is Shell polybutylene at MI = 1.0
Haze and clarity are based on ASTM D1003, Gloss value based on ASTM D-2457.

As may be seen from Table 1, Formulation No. 1 containing 20 weight percent PB 1600SA and 80 weight percent polyethylene (PE) exhibited a high haze value of 17.4. PB 1600SA consisted of Shell polybutene-1 PB 8640, 8% polyethylene, 0.08% slip additive (S) and 0.3% antiblock agent (A). The slip additive may be a primary amide and the antiblocking agent may be a silica. In the present case, an oleamide was used by the name Keamide U ® available from Witco Chemical and a silica under the name of Superfloss ® was used as the antiblocking agent, available from Johns Manville. Formulation No. 2 contained 20 weight percent PB 1710SA. PB 1710 SA consisted of Shell polybutene-1 PB 8640, 7% Shell polypropylene (PP) 0.08% slip additive(s) and 0.3% antiblock agent (A). The slip and antiblock agent used for PB 1710SA are the same as those for PB 1600SA.

As indicated in Table 1, replacing polyethylene in PB 1600SA of Formulation No. 1 with polypropylene (in PB 1710SA) of Formulation No. 2 (overall polypropylene content=1.4w%) improves the optical properties of the blends. The improvement of optical properties from the PE/PB/PP tertiary blend over the PE/PB binary blend is further illustrated in the following example.

EXAMPLE 2

BLOWN FILM

Polybutylene (PB 8640) having a melt index of about 1 g/10 min and density of about 0.910 g/cm$^3$ was dry blended in a tumbler mixer with polyethylene (USI NA 386) and/or polypropylene (Shell PP 5520). The resultant blends were prepared into film by the same fabrication method as stated in Example 1. Table 2 illustrates the optical properties of blown film from a polyethylene/polybutylene (PE/PB) or polyethylene/-polybutylene/polypropylene (PE/PB/PP) blend.

TABLE 2

OPTICAL PROPERTIES OF BLOWN FILM FROM PE/PB/PP BLENDS FOR PEEL SEAL APPLICATIONS

| Blend Composition | Haze, % | Gloss (45°) | Clarity, % |
|---|---|---|---|
| 1. PE + 20% PB 8640 — Control | 14.9 | 39 | 0.46 |
| 2. PE + 20% PB 8640 + 5% PP 5520 | 12.4 | 39 | 0.48 |
| 3. PE + 15% PB 8640 + 5% PP 5520 | 12.5 | 37 | 0.88 |
| 4. PE + 20% PB 8640 + 10% PP 5520 | 12.6 | 42 | 0.52 |
| 5. PE + 10% PB 8640 + 10% PP 5520 | 10.3 | 46 | 1.7 |

Note:
PE is USI NA386 Polyethylene at MI = 1.5
PB 8640 is Shell Polybutylene at MI = 1.0 or MF = 2.5
PP 5520 is Shell Polypropylene at MF = 5.0
Haze and clarity values based on ASTM D-1003, Gloss value based on ASTM D-2457

As may be seen from Table 2, Formulation No. 1 (the control) containing 20 percent polybutene-1 and 80 percent polyethylene exhibited a high haze value of 14.9 percent. Formulation No. 2 contained 20 percent PB 8640 and, additionally, 5 percent PP 5520. Haze value improved to 12.4 percent.

Formulation No. 3 contained 15 percent PB 8640 and 5 percent PP 5520—the same as Formulation No. 2 but 5 percent less PB 8640. Interestingly, Formulation No. 3 exhibited a haze value almost identical to that of Formulation No. 2 and yet Formulation No. 3 contained 5 percent less PB 8640.

Formulation No. 4 illustrates that an increase in the relative percent of polypropylene (PP 5520) to the 20 percent PB 8640 of Formulation No. 2 results in no significant improvement in haze. However, in Formulation No. 5 the use of as low as 10 percent PB 8640 combined with 10 percent PP 5520 results in a quite low haze value of 10.3 percent. But, Formulation No. 5 exhibits poor sealability due to the low percent of PB 8640 used (10 percent). This will be explained further in Table 3.

Thus, it is apparent from Table 2 that Formulation No. 3 is the preferred formulation—yielding a quite acceptable haze value of 12.5 percent. For example, compared to the haze value obtained by the control (14.9 percent), Formulation No. 3 surprisingly exhibits a remarkable decrease in percent haze and an increase in clarity.

TABLE 3

PEEL-SEAL STRENGTH OF BLOWN FILM FROM PB/PE/PP BLENDS

| BLEND COMPOSITION | PEELABLE SEAL STRENGTH, G/IN WIDTH SEALING TEMPERATURE, °F. | | | |
|---|---|---|---|---|
| | 220 | 230 | 240 | 260 |
| 1. PE + 20% PB 8640 — Control | 158 | 166 | 274 | 318 |
| 2. PE + 20% PB 8640 + 5% PP 5520 | 132 | 143 | 462 | 454 |
| 3. PE + 15% PB 8640 + 5% PP 5520 | 159 | 156 | 386 | 438 |
| 4. PE + 20% PB 8640 + 10% PP 5520 | 236 | — | 419 | 415 |
| 5. PE + 10% PB 8640 + 10% PP 5520 | — | 145 | 150 | 191 |

Note:
Film Thickness is 2 mils, Sealing Conditions: 2 Sec. Dwell, 20 psi, Two Sides Heated and One Side with Teflon Cloth.
PB is USI NA386 Polyethylene at MI = 1.5,
PB 8640 is Shell Polybutylene at MI = 1.0 or MF = 2.5,
PP 5520 is Shell Polypropylene at MF = 5.0,
PB 1600SA is Shell Polybutylene at MI = 1.0 or MF = 2.5
PB 1710SA is Shell Polybutylene at MI = 1.0 or MF = 2.5
Seal strength tested by an Instron tester at 10"/min.

As may be seen from Table 3, five different blend compositions were tested for seal strength in grams per inches at sealing temperatures of 220, 230, 240 and 260° F. Again, Formulation No. 1 (the control) contained 20 percent PB 8640 and polyethylene as the control. It had a seal strength range of 158 to 318 between 220° F. and 260° F. In contrast, Formulations No. 2 and 4 exhibited seal strengths at 240° and 260° F. which were strong compared to those exhibited by the control at 240° and 260° F. Formulation No. 5 resulted in seal strengths that were too weak compared to the Control.

Formulation No. 3, exhibited seal strengths which were comparable to those of the control even though the seal strengths at 240° and 260° F. were higher than those of the control, they were not as high in Formulation No. 3 as they were in Formulation No. 2. Thus, the use of 5 percent polypropylene and only 15 percent PB 8640 results in seal strength values that are quite acceptable.

EXAMPLE 3

CAST FILM

Polybutylene (1600SA, PB 8240, PB8340 and PB 1710SA) each having a melt index of about 1 g/10 min. and a density of about 0.910 were dry blended in a tumbler mixer with polyethylene (USI NA 386) and/or polypropylene (Shell PP5520 or Shell PP 5820). The resultant blends were extruded at a die temperature of about 420° F. into film of about 1.75 mils in thickness each using a flat die. Optical properties and peel seal strength were tested with the same procedure and method as stated in Example 1. The results obtained are illustrated in Tables 4 and 5.

TABLE 4

OPTICAL PROPERTIES OF CAST FILMS FROM EVA/PB/PP BLENDS FOR PEEL SEAL APPLICATIONS

| BLEND COMPOSITION | HAZE, % |
|---|---|
| 1. EVA + 25% PB 1600SA — Control | 44.1 |
| 2. EVA + 25% PB 8640 | 47.7 |
| 3. EVA + 25% PB 8640 + 5% PP 5520 | 32.3 |
| 4. EVA + 25% PB 8340 | 3.9 |
| 5. EVA + 25% PB 8340 + 5% PP 5820 | 2.7 |
| 6. EVA + 25% PB 1710SA | 30.2 |
| 7. EVA + 25% PB 8240 | 9.6 |
| 8. EVA + 25% PB 8240 + 5% PP 5520 | 8.2 |

Note:
EVA is Dupont Alathon 3134 at MI = 8.0 and VA Content = 12 w %
PB 1600SA is Shell Polybutylene at MI = 1.0 (Condition "E", 190° C.)
PB 8640 is Shell Polybutylene at MI = 1.0 (Condition "E", 190° C.)
PB 8340 is Shell Polybutylene at MI = 4.0 (Condition "E", 190° C.)
PB 8240 is Shell Polybutylene at MI = 2.0 (Condition "E", 190° C.)
PP 5520 is Shell Polypropylene at MF = 5.0 (Condition "L", 230° F.)
PP 5820 is Shell Polypropylene at MF = 12.0 (Condition "L", 230° F.)
Haze value based on ASTM D1003

Table 4 reveals optical properties of cast films made of EVA/polybutylene/polypropylene blends for peel seal applications. Formulation No. 1 contains EVA with 25 percent PB 1600SA as the control and resulted in a haze value of 44.1 percent. Formulation No. 2 which contained 25 percent PB 8640 resulted in an even worse haze value of 47.7 percent. Formulation No. 3 had somewhat improved clarity over that exhibited by Formulation No. 2, due to the addition of 5 percent PP 5520.

Formulation Nos. 4 and 5, contained 25 percent PB 8340 and 25 percent PB 8340 and 5 percent PP 5820, respectively. It is evident that the use of PB 8340 substantially decreases the percent haze from that of the control and that the addition of 5 percent PP 5820 further reduces the percent haze to a quite acceptable value of 2.7 percent.

In contrast, Formulation No. 6 contained 25 percent PB 1710SA and exhibited a high haze value of 30.2 percent albeit an improved haze value over the control. Note that PB 1710SA contains 8% Shell PP 5520 and has the same type and amount of slip additive and antiblocking agent as does the control.

Formulation Nos. 7 and 8 contain 25 percent PB 8240, and 25 percent PB 8240 plus 5 percent PP 5520, respectively. Both haze values were low, the addition of the 5 percent PP 5520 resulted in a haze value even lower than that obtained in Formulation No. 7.

The preferred formulation in Table 4 is Formulation No. 8—25 percent PB 8240 and 5 percent PP 5520. Formulation No. 5 appears to have a better value than that of Formulation No. 8, however, Formulation No. 5 results in too much stickiness and problems in processing. It should also be noted from Table 4 that Formulation No. 1 (the control) represents the film coated on PVC used currently by major packaging companies which film currently exhibits as much as 20% haze—unacceptable haze value for the applications discussed herein for high clarity packaging.

TABLE 5

PEEL-SEAL STRENGTH OF CAST FILMS FROM PB/EVA/PP BLENDS

| BLEND COMPOSITIONS | PEELABLE SEAL STRENGTH, G/IN WIDTH SEALING TEMPERATURE, °F. | | | | |
|---|---|---|---|---|---|
|  | 200 | 210 | 220 | 240 | 260 |
| 1. EVA + 25% PB 1600SA — Control | 458 | — | 580 | 655 | — |
| 2. EVA + 25% PB 8640 | 359 | — | 721 | 765 | — |
| 3. EVA + 25% PB 8640 + 5% PP 5520 | 73 | — | 415 | 440 | 891 |
| 4. EVA + 25% PB 8340 | 113 | 150 | 400 | 551 | 931 |
| 5. EVA + 25% PB 8340 + 5% PP 5820 | 92 | 121 | 381 | 275 | 683 |
| 6. EVA + 25% PB 1710SA | 173 | 393 | 431 | 650 | — |
| 7. EVA + 25% PB 8240 | 102 | 315 | 622 | 803 | — |
| 8. EVA + 25% PB 8240 + 5% PP 5520 | 118 | — | 364 | 400 | 520 |

Note:
Film Thickness is 1.75 Mils. Sealing Conditions: 2 sec. Dwell, 20 Psi, Two Side Heated and One Side with Teflon Cloth.
EVA is Dupont Alathon 3134 at MI = 8.0 and VA Content = 12%
PB 8640 is Shell Polybutylene at MI = 1.0 (Condition "E", 190° C.)
PB 8240 is Shell Polybutylene at MI = 2.0 (Condition "E", 190° C.)
PB 8340 is Shell Polybutylene at MI = 4.0 (Condition "E", 190° C.)
PP 5520 is Shell Polypropylene at MF = 5.0 (Condition "L", 230° C.)
PP 5820 is Shell Polypropylene at MF = 12 (Condition"L", 230° C.)
Seal strength tested by an Instron tester at 10"/min.

Table 5 illustrates peel seal strength of cast films from EVA/polybutene-1/polypropylene blends at sealing temperatures varying from 200° to 260° F.

Formulation No. 1 in Table 4 is the control containing 25 percent PB 1600SA. It may be noted that the seal strength of Formulation Nos. 2, 3 and 6 in Table 5 is good, however, comparison of the optics of these three Formulation Nos. in Table 4 (Nos. 2, 3 and 6) reveals 47.7, 32.3 and 30.2 percent haze (entirely unacceptable). Formulation No. 5 of Table 4 resulted in seal strengths too low to be effective even though Formulation No. 5 exhibited extremely low percent haze in Table 4. Formulations No. 4 has both good peel seal strength and low haze value but the polymer mixture will be too tacky to process during film fabrication. Thus, the only Formulations in Table 5 which exhibited both comparable seal strength and low percent haze are Formulation Nos. 7 and 8, i.e., 25 percent PB 8240, and 25 percent PB 8240 and 5 percent PP 5520, however, Formulation No. 8 (which contained 5% PP 5520) exhibited the most preferred seal strength and lowest percent haze.

In summary, it has become known to applicant that the addition of about 5 percent polypropylene (PP 5520) to approximately 15 to 25 percent polybutene-1 and either about 80 percent polyethylene or about 70 percent EVA results in a unique film which has good peel seal strength, good processability and good optics.

What is claimed is:

1. A laminar structure comprising a substrate to which is bonded a film or sheet with improved clarity, which is capable of forming peel seals, having acceptable seal strengths, said film or sheet comprising a polymer mixture consisting of:
   from about 65 percent by weight to about 85 percent by weight of an ethylenic polymer or copolymer selected from the group consisting of linear low density polyethylene, low density polyethylene, medium density polyethylene, ethylene vinyl acetate copolymer, ethylene methyl acrylate copolymer and high density polyethylene;
   from about 5 percent by weight to about 30 percent by weight of the butene-1 polymer or copolymer; and
   from about 3 percent by weight to about 15 percent by weight of propylene polymer or copolymer.

2. The laminar structure of claim 1 which contains from about 70 percent by weight to about 80 percent by weight of said ethylenic polymer or copolymer;
   from about 10 percent by weight to about 25 percent by weight of said butene-1 polymer or copolymer; and
   from about 5 percent by weight to about 10 percent by weight of said propylene polymer or copolymer.

3. The laminar structure of claim 1 which contains: about 80 percent by weight of said ethylenic polymer or copolymer; about 15 percent by weight of said butene-1 polymer or copolymer; about 5 percent by weight of said propylene polymer or copolymer.

4. The laminar structure in claim 1, wherein said substrate is selected from the group consisting of nylon, polyester, polyvinylchloride, high density polyethylene, polypropylene, polycarbonate or polystyrene.

5. The laminar structure in claim 1, wherein said film or sheet is unoriented or oriented.

* * * * *